Figure 1:
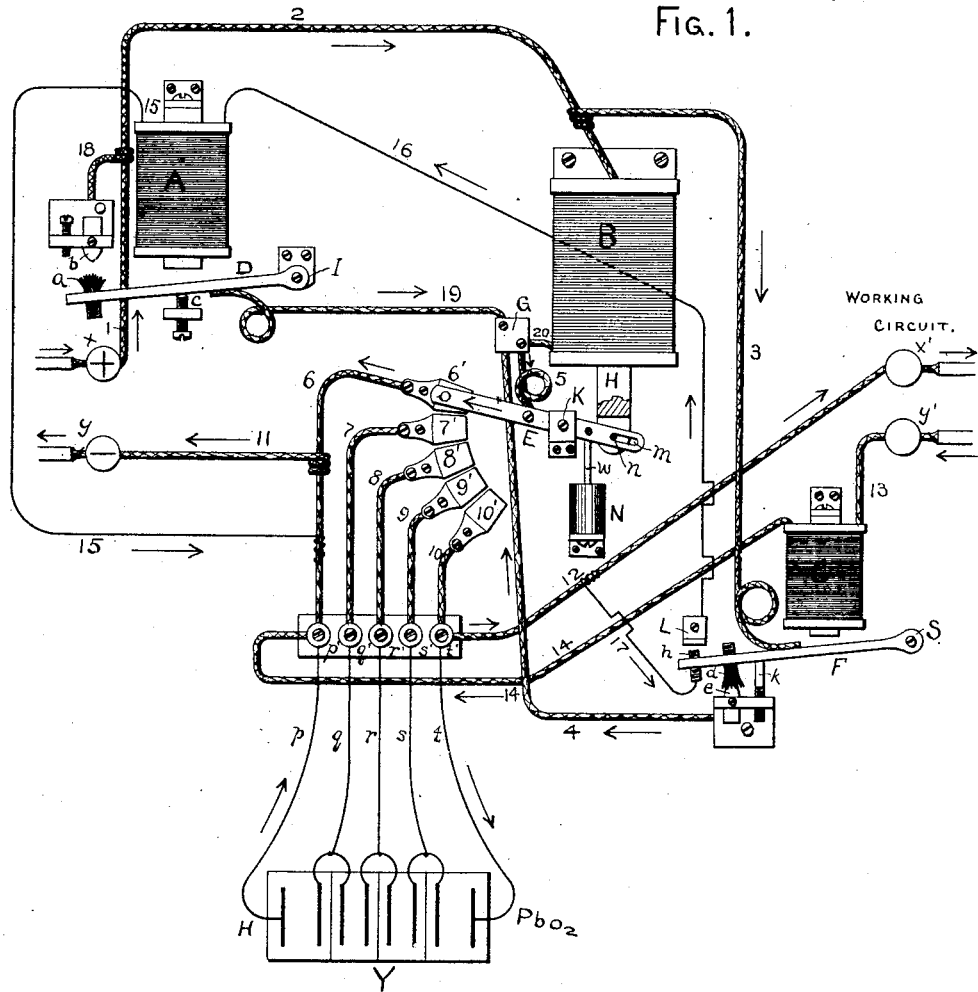

(No Model.)

W. STANLEY, Jr.
APPARATUS FOR CHARGING AND DISCHARGING SECONDARY BATTERIES.

No. 313,117. Patented Mar. 3, 1885.

WITNESSES:
Harry Averington
John S. Derby

INVENTOR.
William Stanley Jr.
By Clarkson A. Collins
Atty

United States Patent Office.

WILLIAM STANLEY, JR., OF ENGLEWOOD, NEW JERSEY.

APPARATUS FOR CHARGING AND DISCHARGING SECONDARY BATTERIES.

SPECIFICATION forming part of Letters Patent No. 313,117, dated March 3, 1885.

Application filed January 26, 1884. (No model.)

*To all whom it may concern:*

Be it known that I, WILLIAM STANLEY, Jr., a resident of Englewood, in the county of Bergen and State of New Jersey, have invented certain new and useful Improvements in Apparatus for Charging and Discharging Secondary Batteries, of which the following is a full and complete specification.

My invention is intended to be applied to a system containing electric lights or other translating devices, one or more secondary batteries, and a generator of electricity adapted to supply a constant current where the generator furnishes the current to the translating devices and the battery acts as a storage-shunt the shunting capacity of which is inversely as the amount of current used in the translating devices until the storage-battery has acquired a predetermined charge, when it becomes the sole source of supply of current for the translating devices.

My apparatus is so constructed and arranged that when no current is passing through the working or discharging circuit the battery and working circuit will be wholly disconnected from the main or charging circuit. On the other hand, the battery and working circuit will be thrown into the main or charging circuit when the translating devices or any one of them is thrown into circuit with the battery, and whenever the battery on being connected with the main circuit is not fully charged will remain connected with the charging-circuit until it becomes fully charged, or until the lights or other translating devices are thrown out of circuit, when the battery and working circuit will be disconnected from the charging-circuit whether the battery is fully charged or not. From what has been stated it will appear that the battery can never become fully charged except when it has a path of discharge ready through the working-circuit. There may be any number of batteries connected so as to be charged from a single generator, and each battery may consist of any number of elements, which are arranged, as shown in the drawings, so that the battery shall be thrown into or out of the charging-circuit cell by cell, or a few cells at a time.

In the drawings, Figure 1 shows the details of my apparatus, in which Y represents a secondary battery. A is an electro-magnet of high resistance, having an armature, D, hinged at I, and provided with the metallic brush $a$, making contact when the armature is lifted with the metallic contact-point $b$. The distance which the armature D falls is regulated by the adjustable stop $c$.

B is a solenoid, having a movable core, H, at the lower end of which is a pin, $n$, passing through a slot, $m$, in one end of the lever E. The lever E is hinged, as at K, and may have one end, $o$, weighted, to enable the solenoid B to more easily lift the core H. The end $o$ of the lever E, when moved by the lifting of the core H of the solenoid B, makes contact successively with the contact-plates 6' 7' 8' 9' 10', to which are attached the wires 6 7 8 9 10, leading to the cells of the battery Y.

N is a dash-pot, the plunger $w$ of which is attached either directly to the core H or to the lever E, to retard and steady the motion of the core H, for the purpose of giving the generator sufficient time to magnetize itself before the whole electro-motive force of the battery opposes it.

C is an electro-magnet located in the discharging-circuit, and having the movable armature F, hinged at one end, S, and provided with the metallic brush $d$, making contact when the armature F is down with the metallic contact-point $e$. The armature-lever F is also provided with a contact-point, $h$, making contact when the lever F is lifted with the plate L, and completing the circuit through the magnet A and wires 16 and 17. The fall of the armature-lever F is regulated by the adjustable stop $k$. The contacts $a$ and $d$ on the lever-armatures D and F are formed of brushes of fine wire, so as to insure good contact.

To the armature-lever D is attached a wire, 19, the other extremity of which is connected at the plate G with the wire 5, which is attached to the lever E. This forms a shunt-circuit around the solenoid B, when the lever-armature D is lifted, through the line 18, contact-point $b$, brush $a$, lever D, line 19, line 5, lever E, contact-piece 6', line 6, and line 11.

To the wire 5 at the plate G are also attached the wire 20, making a part of the circuit through the solenoid B, and the wire 4, making, when the lever-armature F is down, a part of the circuit through the wires 1 2 3, lever F, brush $d$, contact $e$, wire 4, and wire 5 to the lever E.

To the contact-plates 6′ 7′ 8′ 9′ 10′, which are insulated from each other, are attached wires 6 7 8 9 10, leading to binding-screws $p'$ $q'$ $r'$ $s'$ $t'$, where they are connected with wires $p$ $q$ $r$ $s$ $t$, leading to the plates of the battery.

The battery-plates are connected in pairs, as shown in the drawings, and to each of the end plates, and to the wire connecting each pair of intermediate plates, is attached one of the wires $p$ $q$ $r$ $s$ $t$, or, if desired, only every other pair (or less) of the intermediate plates need be connected with the wires $p$ $q$ $r$ $s$ $t$. $x$ $y$ and $x'$ $y'$ are binding-screws where the wires leading respectively to and from the charging and working circuits are attached.

Figure 2:
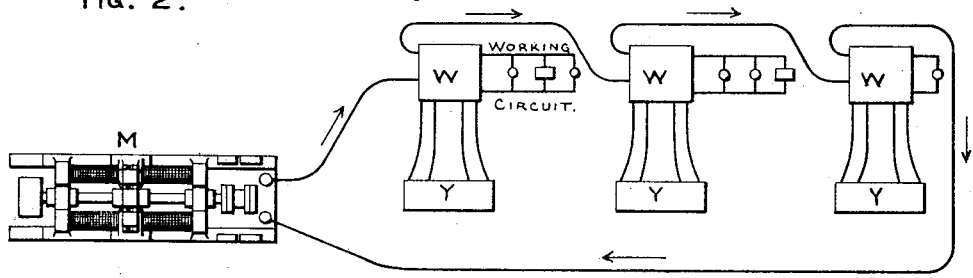

When none of the translating devices are in operation, so that no current is flowing in the discharging or working circuit, the movable parts of the apparatus occupy the position shown in the drawings, whether the generator is in operation or not. If the generator is in operation, the current from it will not pass through either of the magnets A B C, but entering at the binding-screw $x$ will pass through line 1, line 2, line 3, lever F, brush $d$, contact $e$, line 4, line 5, lever E, contact-plate 6′, line 6, and line 11 to the binding-screw $y$, and so back to the generator, or to another battery or series of batteries. All the movable parts of the apparatus remain at rest in the position shown in Fig. 1 of the drawings until current passes through the working-circuit, both the battery and the working-circuit being out of circuit with the generator. Suppose that the battery having received some previous charge, (which it may be caused to do by lifting the core H so as to bring the end $o$ of the lever E upon the contact-plate 10′,) a translating device, such as an electric light, is thrown into the discharging or working circuit. A current will at once pass from the battery through the line 12 to the binding-screw $x'$, thence into the working-circuit, through it to the binding-screw $y'$, through line 13, magnet C, and line 14 to the other terminal of the battery Y. The magnet C will be energized by the current passing through it and will lift the armature-lever F, breaking the contact between the brush $d$ and contact-point $e$, and closing the circuit through lines 16 and 17 by bringing the contact-point $h$ against the plate L. The circuit through the contacts $d$ and $e$ being now open, the current from the generator will pass through the magnet B, energizing it and lifting the core H, so as to bring the end $o$ of the lever E down onto the contact-plate 10′. The current from the generator will now pass through lines 1 and 2, solenoid B, line 20, line 5, lever E, contact-plate 10′, and wire 10 to the binding-screw $t'$, whence so much of it as may be required for the translating devices in circuit will pass through line 12 to the working-circuit, and the surplus will pass through the line $t$ to the battery Y to charge it. Both parts of the generator-current unite again at the binding-screw $p'$, and flow thence through lines 6 and 11 to the terminal $y$, and thence through another portion of the system, and so back to the generator. When the translating devices continue in circuit until the battery becomes fully charged or charged to a predetermined point, it will be cut out of the charging-circuit by means of the magnet A, which is located in a shunt-circuit to the terminals of the battery connecting line 6 with line 12. The magnet A is wound with fine wire to afford a high resistance, and its resistance is so adjusted that when the battery Y is fully charged, or when its charge reaches a predetermined point, enough current will pass through the magnet A to energize it sufficiently to lift the armature-lever D. The current from the generator will be diverted from line 2 into line 18, this being a circuit of lower resistance to the contact-plate G than is the circuit through the solenoid B. The solenoid B will be demagnetized, so as to permit the core H to drop and bring the end $o$ of the lever E into contact with the plate 6′, and the current from the generator will pass through lines 1 and 18, contacts $b$ and $a$, lever D, lines 19 and 5, lever E, contact-plate 6′, and lines 6 and 11 back to the generator, either directly or through other batteries that may be in the charging-circuit. The battery will now furnish current to the working-circuit until it approaches the point of exhaustion, when the current flowing through line 15, magnet A, lines 16 and 17 to line 12 will become so diminished as to allow the armature-lever D to fall, when the charging-current will again pass through the solenoid B, and the charging process will be repeated. As the insulated contact-plates 6′ 7′, &c., over which the end $o$ of the lever E passes, are attached to separate cells of the battery, the battery will be cut into and out of circuit by sections, so that its resistance will be added to and taken from the charging-circuit gradually. This will prevent destruction of the movable part by sparks, there being practically no spark between the contact-plates when the battery is connected to or taken from the charging-circuit a part at a time. The battery is also cut out of the charging-circuit, whatever the state of its charge, whenever the translating devices are thrown out of the working-circuit. When this is done, the magnet C is demagnetized and allows the armature-lever F to drop, thus opening the circuit through contacts $h$ and L and closing the circuit through contacts $d$ and $e$. The current follows the circuit of least resistance through line 3 and its continuations. The solenoid B is demagnetized, allowing the core H to drop, bringing the end $o$ of the lever E onto contact-plate 6′, and the circuit from the generator through the apparatus is, as in the case first above stated, through lines 1, 2, and 3, lever-armature F, contacts $d$ and $e$, lines 4 and 5, lever E, plate 6′, and lines 6 and 11 to binding-screw $y$. With this device the operation of the dynamo or other generator of electricity, when the battery is not fully charged, or has less than a predetermined charge, is, first, to supply current to the translating devices in the working-circuit, and, second, to supply the surplus current that may not be required for the translating devices to the battery to charge it. As more translating devices are thrown into the working-circuit less current will be supplied to the battery, until it may be that the whole of the generator-current is required for the working-circuit. Should more current be required for the working-circuit than can be supplied by the generator, a supplemental current will be supplied from the partially-charged battery to assist the current from the generator in operating the translating devices. When the battery is fully charged, or charged to a predetermined point, both it and the working-circuit will, as before stated, be cut out from the main or charging circuit, and the translating devices will be operated by the current from the battery alone. Fig. 2 of the drawings shows a series of batteries, each with its working-circuit and charging and discharging apparatus W attached to the main or charging circuit leading from a generator of electricity, M. Each of the batteries and working-circuits will be cut out of the charging-circuit when the battery becomes fully charged, or when none of the translating devices in the working-circuit are in operation, and the current in the charging-circuit will be employed for the other batteries and working-circuit until all the batteries become charged or the translating devices in all the working-circuits are out of circuit. When translating devices in any working-circuit are again put in operation, or when (the translating devices being in operation) any battery falls below a predetermined charge, such battery and working-circuit will again be connected with the charging-circuit. Any number of batteries and working-circuits not exceeding the capacity of the generator may be receiving current from the charging-circuit at the same time.

Having thus described my invention, what I claim as new, and desire to secure by Letters Patent, is—

1. The combination, with a generator of electricity, a main or charging circuit connected therewith, a secondary battery, a working-circuit, and a magnet located in the working-circuit, of a magnet and switch mechanism controlled by the magnet in the working-circuit and adapted to switch the battery and working-circuit into and out of the charging-circuit, substantially as set forth.

2. The combination, with a generator of electricity, a main or charging circuit connected therewith, a secondary battery, and a working-circuit containing translating devices, of a magnet located in the working-circuit, and a magnet and switch mechanism controlled by the magnet in the working-circuit and adapted to connect the battery and working-circuit with the charging-circuit when one or more of the translating devices are put in operation, substantially as set forth.

3. The combination, with a generator of electricity, a main or charging circuit connected therewith, a secondary battery, and a working-circuit containing translating devices, of a magnet located in the working-circuit, and a magnet and switch mechanism controlled by the magnet in the working-circuit, and adapted to switch the current in the charging-circuit around the battery and working-circuit when the translating devices are thrown out of operation, substantially as set forth.

4. The combination, with a suitable generator of electricity, a main or charging circuit, two or more secondary batteries or groups of batteries, and a working-circuit connected with each of such batteries or groups of batteries, of a magnet in each of the working-circuits, and a magnet and switch mechanism controlled by the magnets in the working-circuits, and adapted to independently and automatically connect each battery or group of batteries and its working-circuit with the charging-circuit when the path through the working-circuit is electrically complete with the battery, substantially as set forth.

5. The combination, with a suitable generator of electricity, a main or charging circuit, two or more secondary batteries or groups of batteries, and a working-circuit connected with each of such batteries or groups of batteries, of a magnet located in each of the working-circuits, and a magnet and switch mechanism controlled by the magnets in the working-circuits, and adapted to automatically and independently disconnect each battery and its working-circuit from the charging-circuit whenever the circuit from the battery through the working-circuit is broken, substantially as set forth.

6. The combination, with a suitable generator of electricity, a main or charging circuit, two or more secondary batteries, and a working-circuit connected with each of such batteries, of a magnet located in each of the working-circuits, and a magnet and switch mechanism controlled thereby, and adapted to automatically and independently switch each of the batteries and its working-circuit into the charging-circuit when current is established in the working-circuit, and out of the charging-circuit when the working-circuit is opened, substantially as set forth.

7. The combination, with a generator of electricity, a main or charging circuit, a secondary battery, and a working-circuit adapted to receive its current from the battery when the latter is charged up to a predetermined point, of a magnet located in the working-circuit, and a magnet and switch mechanism controlled thereby, and adapted to connect the battery and working-circuit with the main circuit when the charge of the battery falls below a predetermined point and the path from the battery through the working-circuit is electrically complete, and then only, substantially as set forth.

8. The combination, with a suitable generator of electricity, a main or charging circuit, a secondary battery, and a working-circuit, of an electro magnet, A, of high resistance, located in a shunt around the terminals of the battery, a solenoid, B, and an electro-magnet, C, located in the working-circuit, the whole so constructed and arranged that when the circuit from the battery through the working-circuit is electrically complete the magnet C and solenoid B shall operate to connect the battery and working-circuit with the charging-circuit, and when the charge of the battery reaches a predetermined point the magnet A shall operate to disconnect the battery and working-circuit from the charging-circuit, substantially as set forth.

9. In an apparatus for charging and discharging secondary batteries, the combination, with a solenoid, B, adapted to form part of a circuit connecting the battery with the charging-circuit, of a series of contact-plates and wires leading therefrom to the cells of the battery, and a movable lever, E, adapted to make contact with the contact-plates, the whole so constructed and arranged as to cut the battery into and out of the charging-circuit cell by cell, or a part at a time, substantially as set forth.

10. In an apparatus for charging and discharging secondary batteries, the combination, with a battery having a series of wires leading from the cells thereof to corresponding contact-plates, of a movable lever forming part of the circuit connecting the battery with the main or charging circuit, and an electro-magnetic device adapted to bring the lever in contact with the contact-plates successively, the whole so constructed and arranged as to cut the battery into and out of the charging-circuit cell by cell, or a part at a time, substantially as set forth.

11. In an apparatus for charging and discharging secondary batteries, the combination, with a battery having a series of wires leading from different cells thereof to corresponding contact-plates, of an electro-magnetic device and a movable lever operated thereby and adapted to connect the battery with and disconnect it from the charging-circuit cell by cell, or a part at a time, substantially as set forth.

In witness whereof I have hereunto subscribed my name, in the presence of two witnesses, this 19th day of January, 1884.

WILLIAM STANLEY, Jr.

Witnesses:
HARRY OVERINGTON,
JOHN S. DERBY.